Sept. 22, 1970     S. STAUBER     3,529,491

GEARING ARRANGEMENT FOR HIGH REDUCTION GEAR RATIOS

Filed July 5, 1968

INVENTOR

SIEGFRIED STAUBER

BY Jacobi & Davidson

ATTORNEYS.

United States Patent Office 3,529,491
Patented Sept. 22, 1970

3,529,491
GEARING ARRANGEMENT FOR HIGH
REDUCTION GEAR RATIOS
Siegfried Stauber, Huttenkopfstrasse 32,
Zurich, Switzerland
Filed July 5, 1968, Ser. No. 742,835
Claims priority, application Switzerland, July 13, 1967,
9,999/67
Int. Cl. F16d 69/00; F16h 13/02, 35/00
U.S. Cl. 74—640                                    7 Claims

ABSTRACT OF THE DISCLOSURE

The invention describes a gearing arrangement for high reduction gear ratios which is of the type comprising two concentric interfitting ring members, the inner ring member being radially deformable such that its wall portion at a number of peripheral locations bears against the other deformable ring member and between such points of contact there exists non-bearing peripheral locations. Both of the ring members are axially displaceable relative to one another in order to infinitely vary the transmission ratio, whereby, the ring members contact one another at different diameters along the direction of displacement.

BACKGROUND OF THE INVENTION

The present invention relates to an improved gearing arrangement and, more specifically, to a so-called pressure gearing arrangement for high reduction gear ratios or speed reduction.

There are already known to the art so-called pressure gearing arrangements or drives for high reduction gear ratios which are of the type incorporating two concentrically interfittingly arranged ring members. The inner ring member is radially deformable so that its wall can bear at a member of peripheral locations against the other ring member and between these contacting or bearing locations there are peripheral locations which do not unite or bear against one another in this way. These gearing arrangements or drives provide only a single fixed transmission ratio which is predetermined by the constructional unit.

SUMMARY OF THE INVENTION

Now, a primary objective of the present invention is to modify such type gearing arrangement in such a way that it is possible to carry out an infinite change or variation of the transmission ratio.

According to the invention, it is contemplated that for the purpose of infinitely varying the transmission ratio both of the ring members are displaceable in axial direction relative to one another, whereby these ring members contact one another at different diameters along the direction of displacement.

By virtue of these measures it is possible, while retaining a very simple construction of the gearing arrangement with a high speed reduction ratio, to obtain an infinite variation of the transmission with a large range of control.

BRIEF DESCRIPTION OF THE DRAWING

The invention will be better understood, and objects other than those set forth above, will become apparent, when consideration is given to the following detailed description thereof.

DESCRIPTION OF THE PREFERRED EMBODIMENTS

Figure 2:
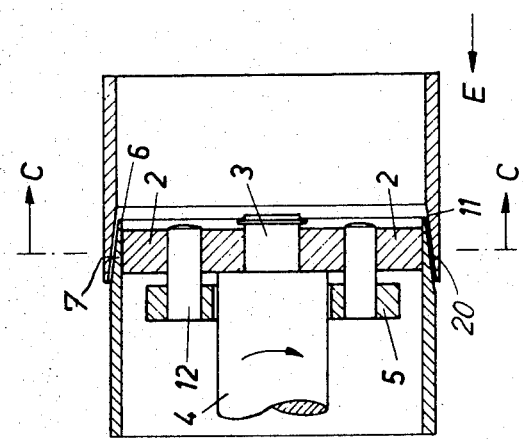
FIG. 2 is a longitudinal sectional view through the embodiment of inventive gearing arrangement depicted in FIG. 1.
Figure 1:
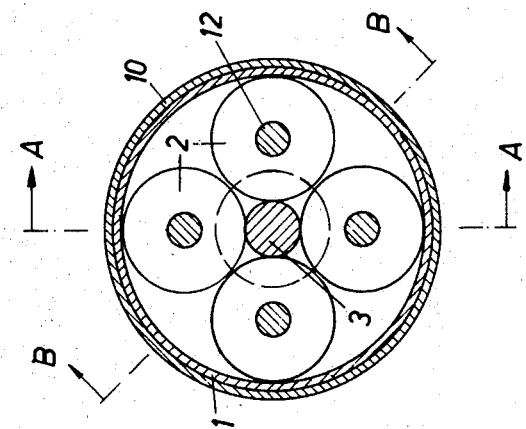
FIG. 1 is a cross-sectional view through a preferred embodiment of inventive gearing arrangement or drive, taken substantially along the line C—C of FIG. 2.

With reference now to the drawing, it will be recognized that the exemplary illustrated embodiment of inventive gearing arrangement or drive embodies an inner ring member 1 in which there are located four planet wheels or gears 2 cooperating with a pinion or sun wheel 3 which is seated upon a drive shaft 4. The planet wheels or gears 2 are supported by means of a cross-arm or carrier 5 which is supported free of the shaft member 4. The planet wheels or gears 2 press against the inner ring member 1, whereby the dimensioning of the components is undertaken in such a way that the irng member 1 deviates somewhat from the perfect or exact circular form and approaches a square configuration with rounded edges. Consequently, the diameter of the inner ring member 1 measured at the locations A—A is somewhat greater than at the locations B—B. This difference can vary in small gearing arrangements or drives in the order of magnitude of several tenths of a millimeter, which explains why it is not readily perceptible or visible in the drawing. Furthermore, it should be understood that the planet wheels 2 and the pinion 3 as well as the inner surface or wall of the ring member 1 can be constructed either as friction wheels or as gears, and therefore the present description should be understood with this in mind. The planet wheels or gears 2 are rotatably seated upon a respective bolt or pin member 12 which, in turn, is rigidly retained at the cross-arm or carrier 5. During a rotation of the pinion 3 the planet wheels or gears 2 roll upon the inner wall or surface of the ring member 1, so that the bent out locations travel on the ring member 1.

Additionally, the ring member 1 is provided at the region towards its end surface 6, at the outside thereof, with a specially configured surface portion 7, which may be in the form of an inclined conical surface or can be an arched or domed surface. For the purpose of this description, it may be assumed that the end surface 6 is in the form of a cone 7. Similarly, an outer ring member 10 is provided at its inner surface, at the region confronting the ring member 1, also with a specially configured surface portion 11, such as an inclined conical surface or an arched or domed surface, but here may be assumed to be a conical surface 11. This conical surface 11 cooperates with the conical surface 7. Since the ring member 1 deviates from an exact circular configuration the conical surface 11 only bears at four locations against the ring member 1 and these locations travel along the periphery when the shaft member 4 and thus the planet wheels 2 rotate. Consequently, the periphery of the conical surface 7 rolls upon the conical surface 11. Since, however, the inner ring member 1, by virtue of its flattened or oblate regions disposed between the planet wheels 2 possesses a somewhat smaller periphery than the ring member 10, during this rolling-off movement there results a peripheral difference which causes a relative rotation of the ring member 1 with respect to the ring member 10. Depending whether the ring member 1 or the ring member 10 is held fixed, the other ring member will rotate by an amount corresponding to the difference between both peripheries, so that there results a relatively large speed reduction ratio.

In order to change this reduction gear ratio or speed reduction ratio, the ring members 1 and 10 are displaced relative to one another in their axial direction, it being assumed that the ring member 10 is formed of deformable or elastic material, for instance a plastic such as nylon. Assuming that the ring member 1 is held fixed in axial direction and that the ring member 10 is displaced in the direction of the arrow E towards the ring member 1, then the effective diameter of the conical surface 11 of the ring member 10 coming into engagement with the conical surface 7 changes, whereby also the speed reduction ratio changes. Since small differences are already sufficient in order to considerably change the reduction gear ratio or speed reduction ratio, thus only correspondingly small axial displacements are required. During this relative movement of the ring members the outer ring member is also deformed to a certain extent at the contact locations. Finally, as previously mentioned, it would be possible to construct the surfaces of the ring members 1 and 10 which come into contact with one another so that they possess a flat arch or dome-like surface. Additionally, the surfaces 7 and 11 of the ring members 1 and 10, respectively can be covered with a suitable friction covering as generally indicated by reference numeral 20.

Now, for the power takeoff, it is possible to optionally use the ring member 1 or the ring member 10, whereby then the other ring member would be fixedly retained. Depending upon whether the ring member 1 or the ring member 10 is held fixed, the direction of rotation of the power takeoff is different, assuming the same direction of rotation for the pinion 3.

Naturally, the entire construction can also be arranged in a reverse manner, in that the planet wheels or the like or the elliptical support or bearing are arranged at the outer periphery of the ring members. Also, for certain applications the pinion 3 can be fixedly retained and the ring members driven, whereby the other ring member or also the pinion 3 serves as the power takeoff.

The stiffness and form of the ring members and the conical or arched portion of the surfaces which roll upon one another are chosen, depending upon their field of application, in such a manner that:

(a) the power remains constant throughout the entire range of rotational speed;
(b) the moment remains constant throughout the entire range of rotational speed; and
(c) the power and the moment proceed or take a course according to requirements.

The gearing arrangement or drive can also be used as a slip coupling when exceeding a predetermined driving-or power takeoff moment. Furthermore, the inner or the outer ring members, depending upon the arrangement, can be a stationary tube or pipe, whereby it is possible to drive the other ring member through the wall of the tube.

The axially displaceable ring member is displaced by means of a suitable shift fork or a threaded thrust collar or a control or adjustment cam, whereby the drive occurs mechanically by hand, hydraulically and pneumatically by a cylinder arrangement or an adjustment drive motor or electrically by magnets or positioning or adjustment motors. The adjustment takes place, depending upon the desired application according to an optional curve, as a function of the rotational speed or moment of rotation by means of the known measures used in the transmission or gearing art. Finally, it is mentioned that a wheel can be arranged within the inner ring member which is coaxial to the shaft member and at its periphery is constructed as a polygon which carries out a sliding movement at the inside of the inner ring member.

It should be apparent from the foregoing detailed description that the objects set forth at the outset to the specification have been successfully achieved.

Accordingly, what is claimed is:

1. A gearing arrangement of the type described for high reduction gear ratios comprising two concentric, cylindrical, radially deformable, interfitting ring members defining an inner ring member and an outer ring member, a driving shaft member, at least one wheel member driven by such driving shaft member, said driving shaft member and said wheel member being located within said inner ring member, said wheel member being in engagement with the inner wall of said inner ring member and at least bending out the wall of said inner ring member, said ring members having facing cooperating surface portions substantially only in the region of said wheel member that have progressively, respectively oppositely extending varying diameters in the axial direction and both of said ring members being axially displaceable relative to another to infinitely vary the transmission ratio, said facing, cooperating surface portions of ring members contacting one another at different diameters along the direction of displacement.

2. A gearing arrangement as defined in claim 1, wherein said surface portion of said inner ring member is inclined.

3. A gearing arrangement as defined in claim 1, wherein said surface portion of said inner ring member is arched.

4. A gearing arrangement as defined in claim 1, wherein said surface portion of said outer ring member is inclined.

5. A gearing arrangement as defined in claim 1, wherein said surface portion of said outer ring member is arched.

6. A gearing arrangement as defined in claim 2, further including friction covering means provided for said surface portions of said ring members.

7. A gearing arrangement as defined in claim 1, wherein said outer ring member is formed of an elastic material.

References Cited

UNITED STATES PATENTS

| | | | |
|---|---|---|---|
| 2,745,298 | 5/1956 | Braunagel et al. | 74—798 |
| 2,930,253 | 3/1960 | Musser. | |
| 3,161,082 | 12/1964 | Musser | 74—640 |
| 3,182,525 | 5/1965 | Tinder et al. | 74—640 |
| 3,187,605 | 6/1965 | Stiff | 74—640 |
| 3,199,370 | 8/1965 | Prior | 74—640 |
| 3,302,474 | 2/1967 | Edlich | 74—215 X |
| 3,304,809 | 2/1967 | Hellen | 74—640 X |
| 3,427,898 | 2/1969 | Mayer | 74—640 |

ARTHUR T. McKEON, Primary Examiner

U.S. Cl. X.R.

74—798